UNITED STATES PATENT OFFICE.

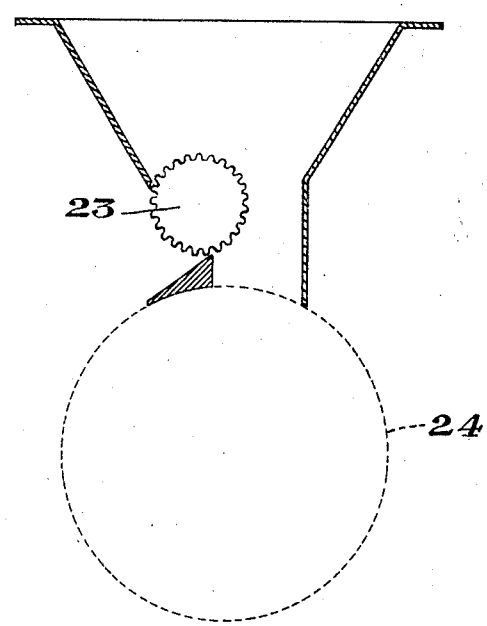

HARRY HEWITT, OF MANCHESTER, ENGLAND, ASSIGNOR OF ONE-HALF TO JOSEPH BAKER & SONS LIMITED, OF LONDON, ENGLAND.

DIVIDING DOUGH.

1,326,930. Specification of Letters Patent. Patented Jan. 6, 1920.

Application filed May 12, 1914. Serial No. 838,098.

*To all whom it may concern:*

Be it known that I, HARRY HEWITT, a subject of the King of Great Britain, residing at Manchester, in the county of Lancaster, in the Kingdom of England, have invented certain new and useful Improvements in Dividing Dough, of which the following is a specification.

In machines for dividing dough it is usual to provide measuring cells into which the dough is forced so as to give charges which ought to be all of uniform weight.

The object of the present invention is an improvement relating to the feeding of dough into the measuring cells *i. e.*, the division boxes or like parts according to which charges of uniform density and therefore of even weight are obtained.

I find that it is possible to remove large gas or air pockets without expelling the smaller pockets and over-compressing or felling the dough, by pressing the dough prior to entering the hopper or charging chamber, by means of a conditioning roller or rollers, so arranged that there is not a closed space between said roller or rollers and the hopper or charging chamber of the apparatus. These rollers are preferably placed above the hopper or charging chamber of the apparatus, and owing to the absence of a closed space, there is no compression of the dough.

Further, I may place the roller or rollers actually within the hopper or charging chamber of the apparatus so arranged as to feed the material directly into the measuring cells of a drum or segment, the feeding being effected by the movement of the rollers. In this case, however, the rollers should move intermittently since if the rollers were moved continuously there would be a danger or overcompressing the dough since a closed space would be present between the rollers and the measuring cells.

When there is not such a closed space, however, as in the form of the invention first described, the rollers may rotate either continously or intermittently.

Figure 1:
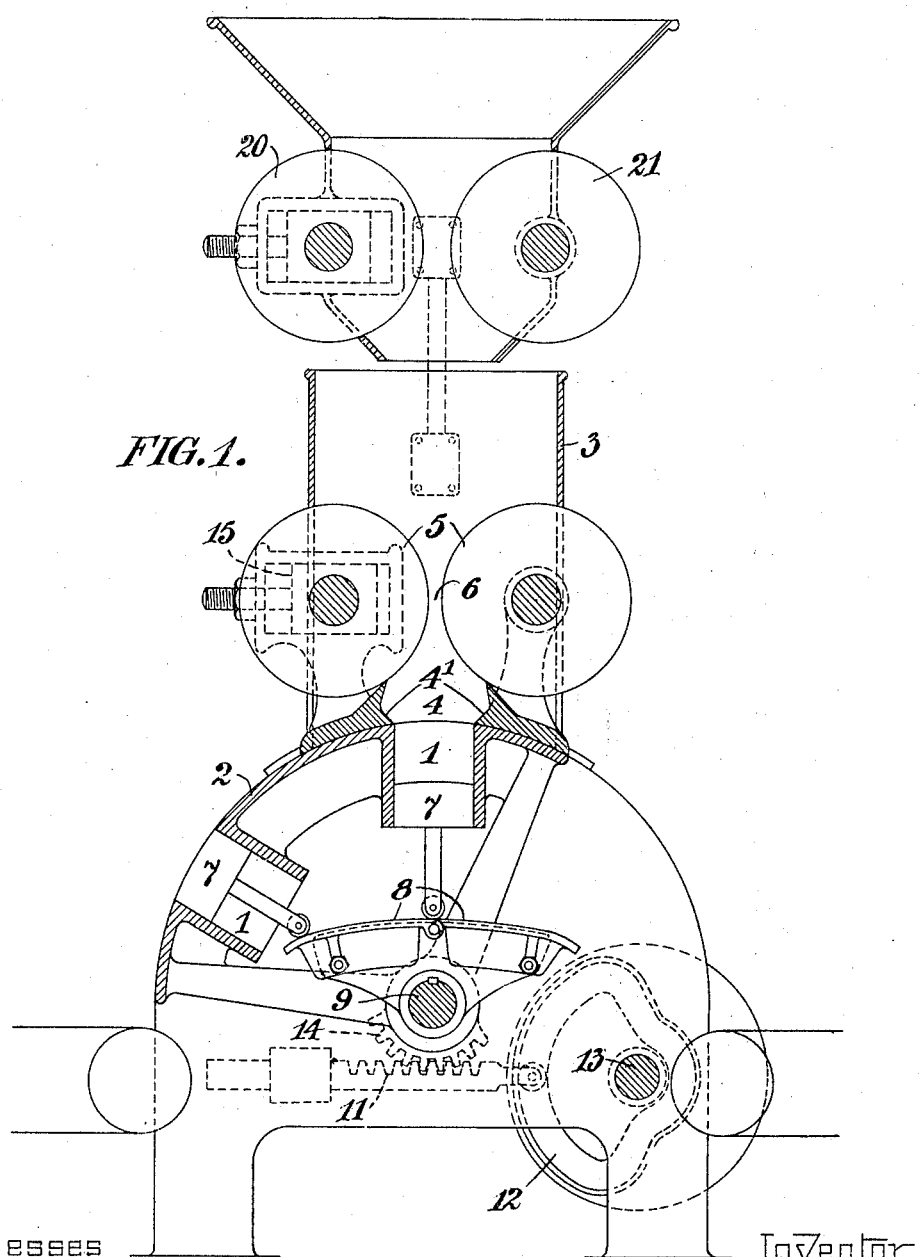

The invention will be understood from the following description reference being had to the accompanying drawings which show by way of example sectional side elevations of dough dividing machines having the present invention applied thereto. Figure 1 shows a dough divider of the type in which the dough is fed into the division boxes by rollers, and Fig. 2 a dough divider of the type in which the dough is fed into the division boxes by a plunger. Fig. 3 shows a modification of Fig. 1.

In the embodiment shown in Fig. 1 of the drawing, 1 are the division boxes in the curved surface of oscillating segment 2. Contiguous to the division boxes, or to the member 2, in which these division boxes are placed, there is a hopper 3 of a width commensurate with the division boxes, and so placed that the boxes 1 can be brought immediately below its center. The hopper outlet 4 closely fits the moving member 2 that carries the division boxes 1 so that the dough cannot escape except into such boxes. This outlet 4 forms a charging chamber. 20 and 21 are a pair of rollers which may rotate continuously or intermittently, arranged above the hopper 3 for the purpose of conditioning the dough. In this embodiment, however, these rollers are not essential as the intermittently rotated rollers 5 serve the double purpose of conditioning and feeding as explained hereafter.

Mounted within the hopper are a pair of mechanically intermittently driven rollers 5 in such a position that a suitable space 6 is left between the peripheries thereof. This space is preferably adjustable to vary the feed of the dough. These rollers may if desired fit in embayments or openings in the sides of the hopper, or be otherwise arranged, so that the only space for the delivery of dough from the hopper is between the rollers 5. These rollers 5 are mechanically rotated in opposite directions, so as to mutually draw the dough down between them, and feed it into the division boxes 1, the division boxes being brought to rest opposite or adjacent to the space 6 between the rollers. The rotation of the rollers is preferably intermittent and the movement of the head or member 2 that carries the division boxes 1 also preferably intermittent, said movements of the respective parts being timed and proportioned the one to the other, so as to act or coöperate in harmony. In order that the feed may be regulated, I arrange that the speed of rotation or surface speed of the rollers can be varied at will, a slow or short movement being necessary for small pieces of dough, and a faster or longer movement for larger pieces, because each size of division box 1 must be filled in the same time. The dough fed from the hopper can be directed into the division boxes by means of guides or scrapers 4' in the charging chamber 4.

In operation, division boxes are brought adjacent the space 6 between the rollers and the rollers are driven in opposite directions. The dough in the hopper is drawn out or rolled out into a sheet like mass by the mutually rotating rollers 5, and forced by them direct into the division boxes 1, so that the boxes become completely and evenly filled. By drawing out or attenuating the dough from the hopper 3, in a comparatively sheet like stratum, I thus prevent any large air or gas pockets or cavities remaining in the dough, while at the same time the dough is not compressed to such an extent as to expel the smaller pockets of occluded gas. There is no overcompression of the dough such as would squeeze out all the occluded gases or fell the dough, but the larger pockets are permitted to escape or be broken up. When one row of division boxes 1 are so filled the segment 2 or drum is turned, or the slide moved and the filled boxes have the dough extruded from them by cam operated plungers 7 or their equivalent in the usual way. In the embodiment shown the movement of the segment 2 brings a second series of boxes below the hopper. If desired instead of feeding the dough into vertical cylinders or pockets these latter may be arranged horizontally in the head of the dividing machine.

In order to assist in the feeding of the dough into the division boxes, the rollers may be corrugated or fluted if desired as shown at 23 in Fig. 3. This however is not absolutely necessary, as the rollers will operate with plain surfaces, and instead of the segment 2 the division boxes may be provided in other manner e. g. around the periphery of a rotatable drum 24 (Fig. 3).

The drawing, Fig. 1, shows a free plunger 7 in each division box, the outward movement being effected by adjustable cams 8 on the shaft 9 arranged to coöperate on the inner ends of the plungers. Any suitable arrangement may be employed for imparting an intermittent oscillation to the segment 2. In the drawing, there is shown diagrammatically, a toothed rack 11 reciprocated by a cam 12 on the first motion shaft 13, which rack gears with a pinion 14 secured to the segment 2, the cam being arranged so that the segment is allowed a period of rest between each oscillation. The rolls 5 are mechanically driven in any suitable way, and the space 6 between the rolls can be diminished or increased by the adjustable screw operated bearings 15.

Instead of using a pair of oppositely rotating rollers, a single roller 23 may be used (Fig. 3) arranged to coöperate with the side of the hopper to force the dough at the proper pressure into the division boxes.

Figure 2:
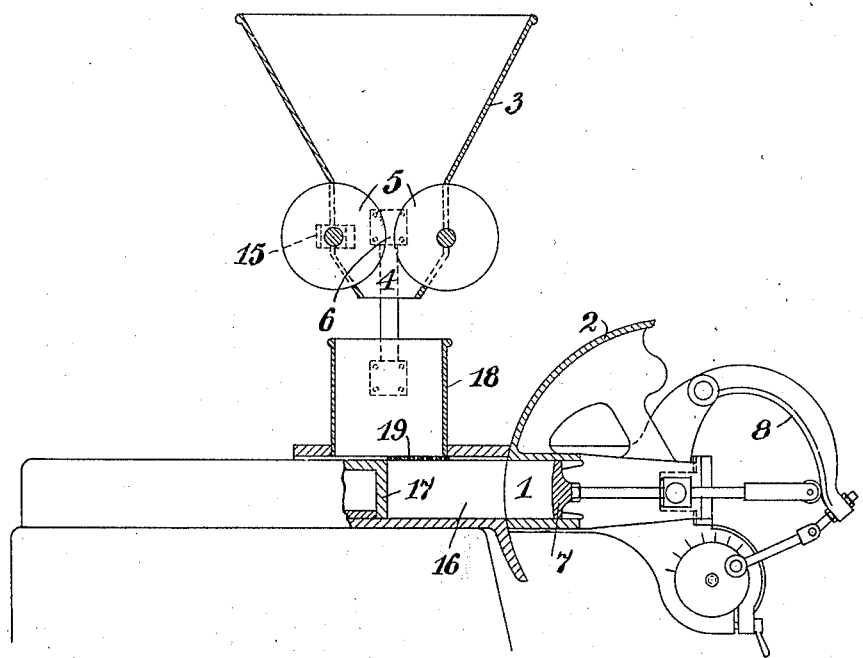

In the embodiment shown in Fig. 2 of the drawing, the invention is applied to that type of divider wherein the dough is fed into the charging chamber 16 from whence it is forced by a heavily weighted or other suitably operated plunger 17 into the division boxes 1. In this embodiment, 5 are the mechanically driven rollers which draw out or feed the dough and deliver it into the hopper 18, and so into the charging chamber 16, 19 being the usual cut-off plate which comes forward as or before the plunger 17 advances, and separates the dough in the hopper from the portion which is being pressed forward by the plunger into the division boxes 1. The rollers 5 are located above the hopper 18 in order to avoid felling pressure on the dough and render the contents of the hopper visible.

I declare that what I claim is:—

1. A dough dividing apparatus comprising in combination dividing means including a measuring cell having a plunger therein and conditioning means including at least one roller arranged in such juxtaposition to said dividing means that the dough leaving the conditioning means traverses an open space before reaching the measuring cell and therefore cannot receive further compression from said conditioning means.

2. A dough dividing apparatus comprising in combination dividing means including a measuring cell having a plunger therein and a pair of conditioning rollers arranged in such juxtaposition to said dividing means that the dough fed through the rollers traverses an open space before reaching the measuring cell and therefore cannot receive further compression from said conditioning means.

3. A dough dividing apparatus comprising in combination dividing means including a measuring cell having a plunger therein and a pair of adjustable conditioning rollers arranged in such juxtaposition to said dividing means that the dough fed through the rollers traverses an open space before reaching the measuring cell.

4. A dough dividing apparatus comprising in combination dividing means including a measuring cell having a plunger therein and a pair of conditioning rollers of variable speed and arranged in such juxtaposition to said dividing means that the dough fed through the rollers traverses an open space before reaching the measuring cell.

5. A dough-dividing apparatus including in combination, dividing means comprising measuring cells and a pair of rotating rollers arranged with respect to said measuring cells in such juxtaposition that the dough is fed directly into the measuring cell with an unrestricted space between the rollers and the cell.

6. A dough-dividing apparatus including in combination, dividing means comprising measuring cells and a pair of rotating rollers arranged with respect to said measuring cells in such juxtaposition that the dough is fed by gravity from the rollers through a long unrestricted space to the measuring cells.

In witness whereof, I have hereunto signed my name this 27 day of April, 1914, in the presence of two subscribing witnesses.

HARRY HEWITT.

Witnesses:
HAROLD EDWIN POTTS,
RICHARD MERCER.